(12) United States Patent  (10) Patent No.: US 9,043,815 B2
Jolfaei et al.  (45) Date of Patent: *May 26, 2015

(54) PROGRAMMING LANGUAGE CONDITIONAL EVENT DISPATCHER

(71) Applicant: SAP SE, Walldorf (DE)

(72) Inventors: Masoud Aghadavoodi Jolfaei, Wiesloch (DE); Stefan Bresch, Offenburg (DE); Helmut Prestel, Bad Schoenborn (DE); Thorsten Marcus Dunz, Schwetzingen (DE); Edgar Lott, Nussloch (DE); Frank Radmacher, Heidelberg (DE); Karsten Bohlmann, Rauenberg (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/465,444

(22) Filed: Aug. 21, 2014

(65) Prior Publication Data

US 2015/0020082 A1 Jan. 15, 2015

Related U.S. Application Data

(63) Continuation of application No. 13/938,092, filed on Jul. 9, 2013, now Pat. No. 8,826,308.

(51) Int. Cl.
G06F 13/00 (2006.01)
G06F 9/54 (2006.01)
G06F 11/30 (2006.01)

(52) U.S. Cl.
CPC .............. *G06F 9/542* (2013.01); *G06F 13/00* (2013.01); *G06F 11/3089* (2013.01)

(58) Field of Classification Search
CPC .................................. G06F 9/541; G06F 9/547
USPC ................................................. 719/328, 330
See application file for complete search history.

(56) References Cited

U.S. PATENT DOCUMENTS

| | | | |
|---|---|---|---|
| 5,548,760 | A | 8/1996 | Healey |
| 7,461,382 | B2 | 12/2008 | Hammerich et al. |
| 7,482,931 | B2 | 1/2009 | Lin |
| 7,647,219 | B2 | 1/2010 | Overturf et al. |
| 7,752,228 | B2 | 7/2010 | Rapp |
| 7,865,887 | B2 | 1/2011 | Kaiser et al. |
| 8,051,428 | B2 | 11/2011 | Hofmann |
| 8,087,036 | B2 * | 12/2011 | Lee ............................ 719/328 |
| 8,191,081 | B2 | 5/2012 | Schmidt et al. |

(Continued)

OTHER PUBLICATIONS

"U.S. Appl. No. 13/938,092, Notice of Allowance mailed Apr. 25, 2014", 9 pgs.

*Primary Examiner* — Andy Ho

(74) *Attorney, Agent, or Firm* — Schwegman Lundberg & Woessner, P.A.

(57) ABSTRACT

Methods and systems of monitoring events occurring in a computer system are provided. An event monitoring instruction including a condition is parsed, the event monitoring instruction expressed using syntax defined in source code, the parsing resulting in an event channel to monitor and the condition. Then execution of an application is paused. The event channel is monitored until an event occurs on the event channel. Then an event handler for the event is run in response to the event occurring on the event channel. The condition is evaluated to determine whether the condition is satisfied. Execution of the application is resumed in response to the condition being satisfied.

20 Claims, 4 Drawing Sheets

(56) References Cited

U.S. PATENT DOCUMENTS

| | | |
|---|---|---|
| 8,281,319 B2 | 10/2012 | Kress et al. |
| 8,316,380 B2 | 11/2012 | Keil et al. |
| 8,327,386 B2 | 12/2012 | Newport et al. |
| 8,433,725 B2 | 4/2013 | Yan et al. |
| 8,458,716 B2 | 6/2013 | Altrichter et al. |
| 8,516,499 B2 * | 8/2013 | Akiyama et al. ............... 719/313 |
| 8,627,299 B2 | 1/2014 | Frank et al. |
| 8,826,308 B1 | 9/2014 | Jolfaei et al. |
| 2003/0135382 A1 | 7/2003 | Marejka et al. |
| 2004/0083292 A1 | 4/2004 | Lueckhoff et al. |
| 2005/0138647 A1 * | 6/2005 | Bou-ghannam et al. ...... 719/328 |
| 2010/0107176 A1 | 4/2010 | Kessler |
| 2012/0310850 A1 | 12/2012 | Zeng et al. |

* cited by examiner

PROGRAMMING LANGUAGE CONDITIONAL EVENT DISPATCHER

This application is a continuation of prior application Ser. No. 13/938,092, now U.S. Pat. No. 8,826,308, filed on Jul. 9, 2013, which is incorporated by reference herein in its entirety.

TECHNICAL FIELD

This document generally relates to methods and systems for use with computer programming.

BACKGROUND

Certain types of programming languages allow for eventing. Eventing provides a mechanism wherein certain occurrences at runtime of a computer program (called events) can trigger additional steps. For example, the Advanced Business Application Programming (ABAP) language includes such an eventing mechanism. Eventing mechanisms in current programming languages have fallen into two categories. The first involves assigning each event type to a dedicated function or method as a handler. Such a system requires that the creator of the programming language anticipate all the different event types that may be encountered by the program. The second involves utilizing remote function calls, which are remote execution of functions in an external system. In some systems, it is even possible to specify conditions under which the events should be received. These conditions are also known as "wait" conditions. However, due to the modular characteristics of some applications, it may be necessary that each layer express its interest in the consumption of event types while still being able to control the consumption order of queued events for the application. This is not possible using remote function calls.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a statement is defined that allows a programmer to specify a method for monitoring an event channel until some logical expression is satisfied. In a further example embodiment, the statement may also contain a timeout value after which the system stops waiting for the logical expression to be satisfied. This allows for a generic event handler without requiring the use of remote function calls.

In an example embodiment, the statement is defined as an Advanced Business Application Programming language (ABAP) statement. ABAP is a high-level programming language used for programming application servers. ABAP programs run on an application server and are persisted inside a database. Within the database, the ABAP code exists in two forms: source code, which can be viewed and edited using ABAP workbench tools, and generated code, which is a binary runtime representation.

Figure 1:
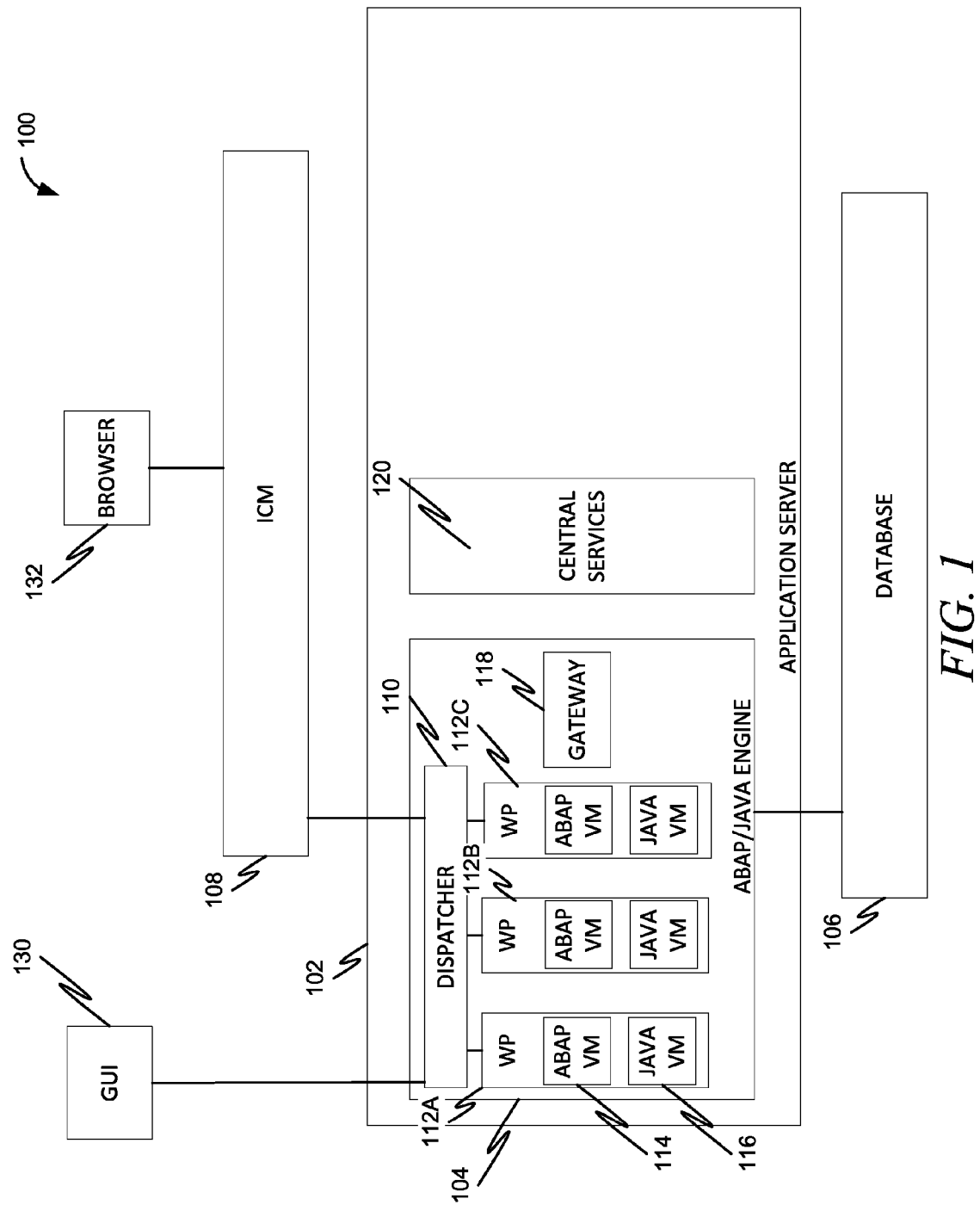
FIG. 1 is a block diagram illustrating a system, in accordance with an example embodiment, configured to monitor events.

FIG. 1 is a block diagram illustrating a system 100, in accordance with an example embodiment, configured to monitor events. The system 100 includes an application server 102 running one or more application server instances 104 as well as one or more databases 106. An Internet Communication Manager (ICM) 108 sets up a connection to the Internet and can process both server and client web requests. A first application server instance 104 may be an ABAP/JAVA engine, which may include a dispatcher 110 that distributes requests to one or more work processes 112A, 112B, 112C. The work processes 112A, 112B, 112C may each contain an ABAP virtual machine 114 and/or a Java virtual machine 116, which are used to execute ABAP or Java programs, respectively. A gateway 118 provides an interface between multiple instances. Central services 120 may exchange messages and balance the load through the system 100.

In ABAP, the (asynchronous) remote function calls trigger the event processing. Once the (asynchronous) remote function call is terminated, then the event handler is executed. The event handler is registered with the addition "CALLING <meth> AT END OF TASK and PERFORMING <perf> AT END OF TASK of the CALL FUNCTION <func> STARTING NEW TASK" statement. The event handler itself is executed in the session of the event loop. The results of the asynchronous remote function call can be processed in the event handler with the RECEIVE RESULTS statement. In an example embodiment, source code in the one or more databases 106 is modified so that the dispatcher 110 in the first application server instance 104 can monitor event channels until a particular logical expression is satisfied (or a timeout period expires).

In the ABAP embodiment, this means that all currently defined event channels, as well as additional channels that may be implemented such as a push channel and a messaging channel, can be monitored in addition to a remote function call. Thus, this essentially turns the dispatcher 110 into an advanced event dispatcher. An application is able to express conditions under which the events in the event channels are received. The application is able to decide how long and how many events should be processed before the execution of the application continues. Furthermore, the application can optionally specify a waiting time for events until the condition is fulfilled. As such, the application is allowed to compensate for the fact that no guarantee exists that a publisher will raise these events of interest.

In an example embodiment, all applications running in the same context support the consumption of events from the same event channels. Thus, in this embodiment, no application instance 104 will be unable to monitor the channel. The new statement provided in the source code within the database(s) allows for this to be accomplished. This allows certain events, such as writing a log or increasing a trace level, to be consumed by any application instance 104, 106 and/or component.

In an example embodiment, a new ABAP statement (or library) is provided. This statement may have the following syntax (or a similar context):

WAIT FOR <event channels> UNTIL <logical expression> [UP TO <timeout> SECONDS]

The placeholder <event channels> specifies any kind of event channel in which the application is interested. All other events that are not expressed in the <event channels> may be queued until either the application enables delivery of the events (e.g., using a WAIT with the proper event channels), the event deregisters the event, or the application terminates. Based on the specified event channels, the associated incoming events are executed and the logical expression <logical expression> is checked after each delivery. The statement may terminate either because the expression is fulfilled or a timeout value is reached.

In an example embodiment (as in ABAP Objects), triggering and handling an event means that certain methods act as triggers and trigger events, to which other methods—the handlers—react. This means that the handler methods are executed when the event occurs. To trigger an event, a class can declare the event in its declaration part and trigger the event in one of its methods.

Figure 2:
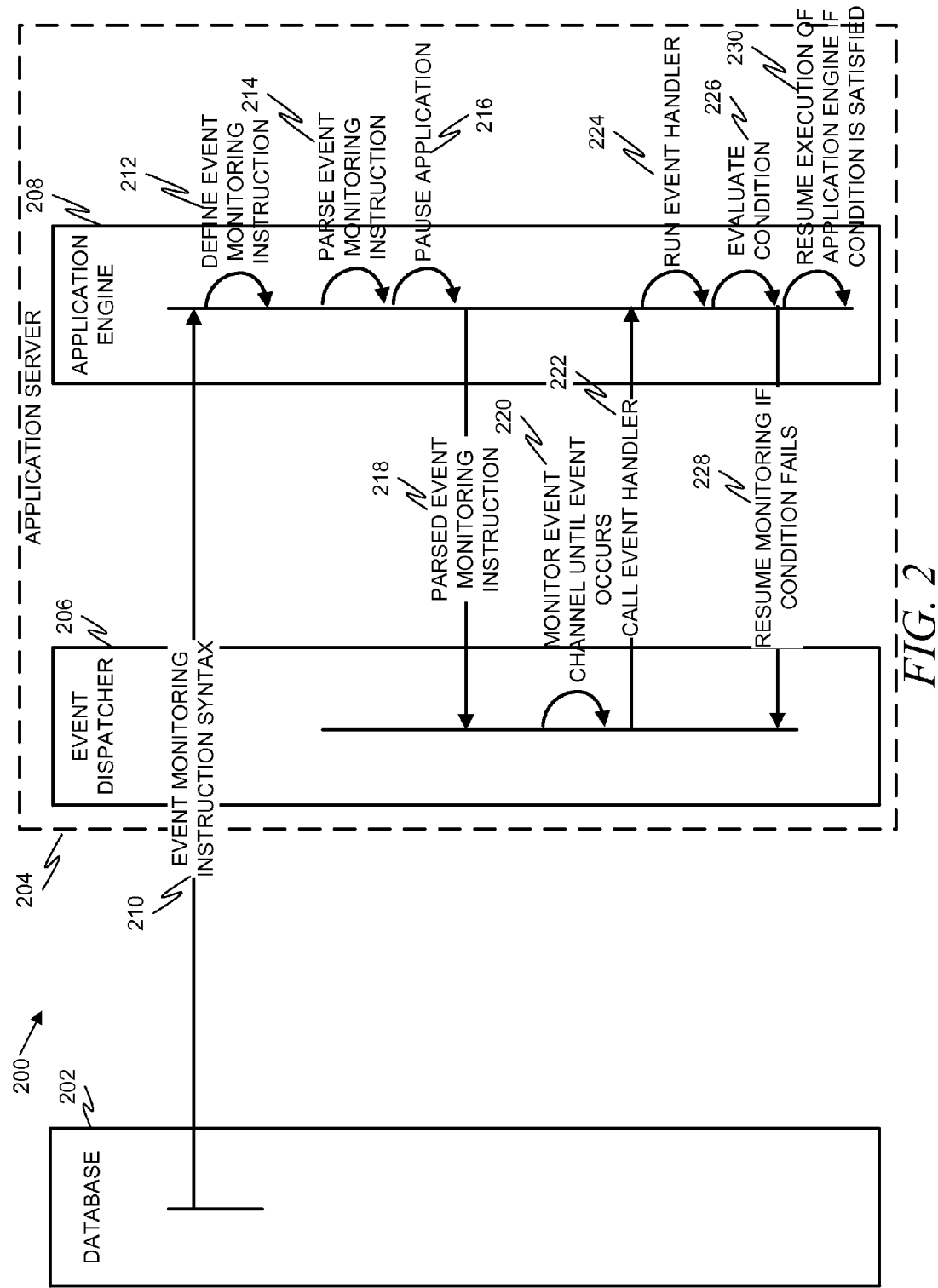
FIG. 2 is an interaction diagram illustrating a method, in accordance with an example embodiment, of monitoring events occurring in a computer system.

FIG. 2 is an interaction diagram illustrating a method 200, in accordance with an example embodiment, of monitoring events occurring in a computer system (e.g., the system 100). The method 200 may utilize a database 202 and an application server 204. The application server 204 may comprise an event dispatcher 206 and an application engine 208. At operation 210, the application engine 208 may retrieve syntax for an event monitoring instruction from the database 202. At operation 212, the application engine 208 may define an event monitoring instruction using the syntax. The event monitoring instruction may include a condition. At operation 214, at runtime, the application engine 208 may parse the event monitoring instruction resulting in an event channel to monitor and the condition. At operation 216, the application engine 208 pauses an application running on the application server 204. At operation 218, the parsed event monitoring instruction is passed to the event dispatcher 206. At operation 220, the event dispatcher 206 monitors the event channel until an event occurs on the event. Once this occurs, at operation 222, an event handler is called. Then, at operation 224, the event handler is run by the application engine 208. At operation 226, the condition is evaluated. If the condition fails, then at operation 228 the event dispatcher 206 resumes monitoring. If the condition is satisfied, then at operation 230 the application engine 208 resumes execution of the application.

Figure 3:
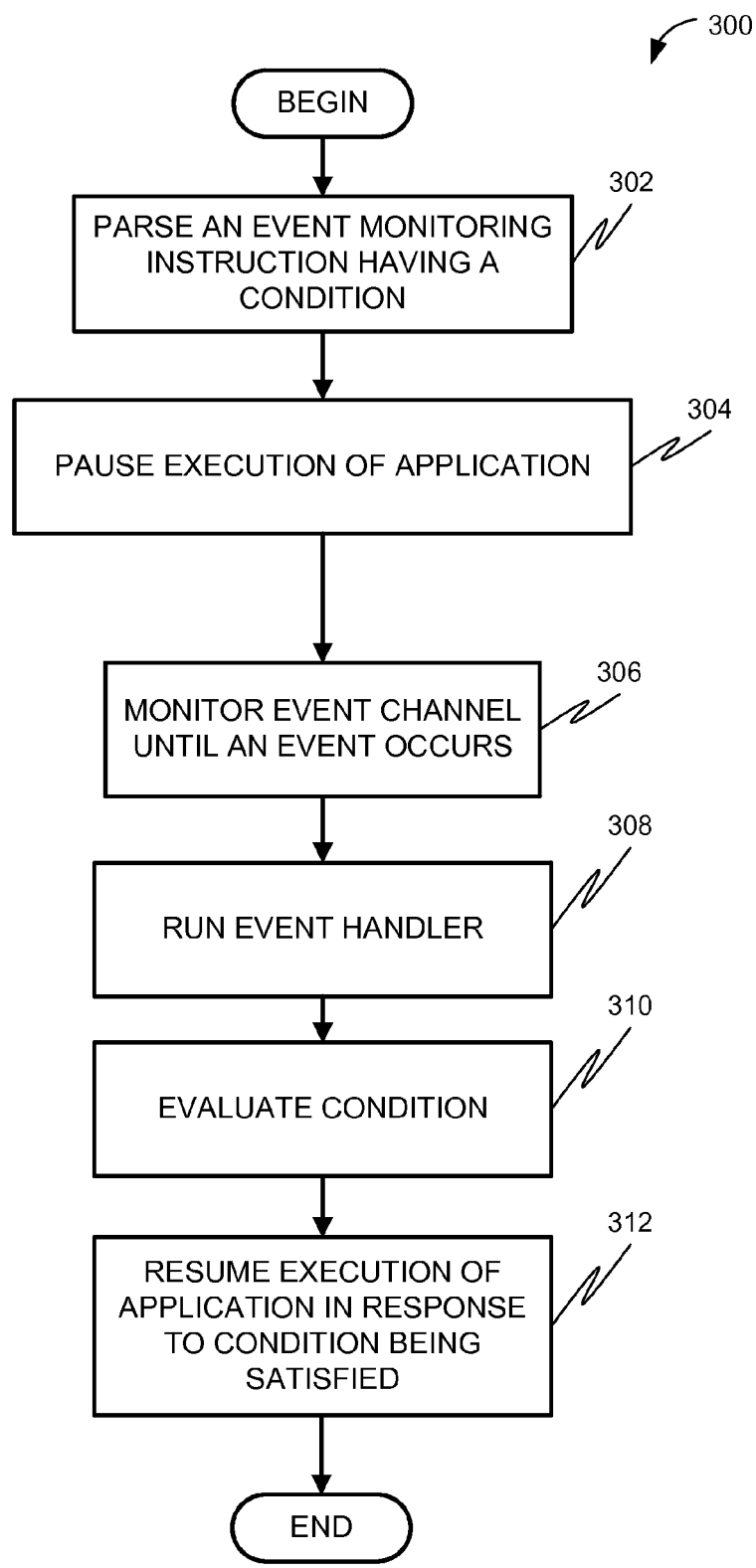
FIG. 3 is a flow diagram illustrating a method, in accordance with an example embodiment, of monitoring events occurring in a computer system.

FIG. 3 is a flow diagram illustrating a method 300, in accordance with an example embodiment, of monitoring events occurring in a computer system (e.g., the system 100). At operation 302, an event monitoring instruction including a condition is parsed, the event monitoring instruction expressed using syntax defined in source code, the parsing resulting in an event channel to monitor and the condition. At operation 304, execution of an application is paused. At operation 306, the event channel is monitored until an event occurs on the event channel. At operation 308, an event handler for the event is run in response to the event occurring on the event channel. At operation 310, the condition is evaluated to determine whether the condition is satisfied. At operation 312, execution of the application is resumed in response to the condition being satisfied.

Figure 4:
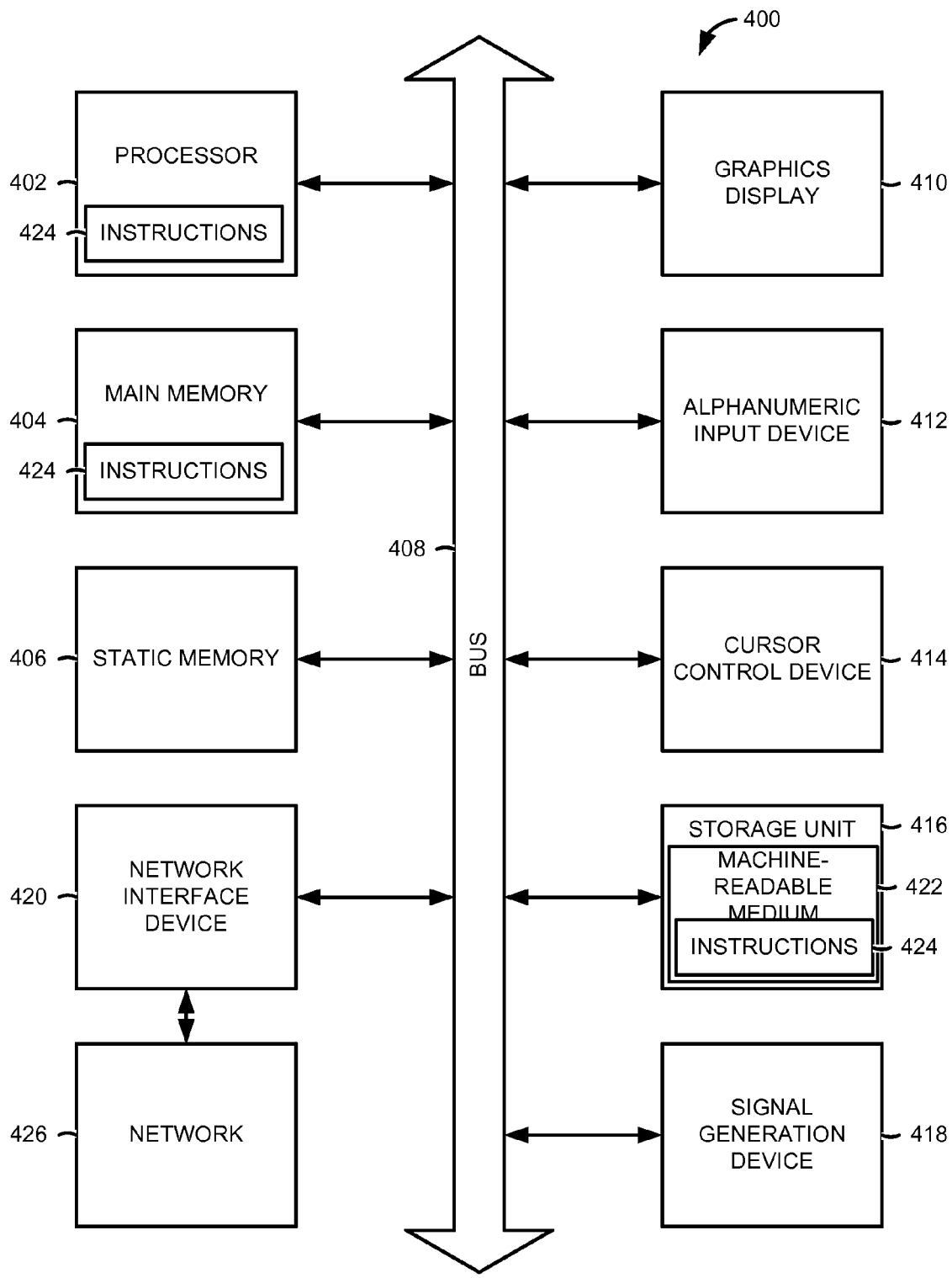
FIG. 4 is a block diagram of a computer processing system at a server system, within which a set of instructions may be executed for causing the computer to perform any one or more of the methodologies discussed herein.

FIG. 4 is a block diagram of a computer processing system 400 at a server system, within which a set of instructions 424 may be executed for causing the computer processing system 400 to perform any one or more of the methodologies discussed herein.

In addition to being sold or licensed via traditional channels, embodiments may also be deployed by Software-as-a-Service (SaaS), application service providers (ASP), or utility computing providers. The computer may be a server computer, a personal computer (PC), a tablet PC, a set-top box (STB), a personal digital assistant (PDA), cellular telephone, or any processing device capable of executing a set of instructions 424 (sequential or otherwise) that specify actions to be taken by that device. Further, while only a single computer is illustrated, the term "computer" shall also be taken to include any collection of computers that individually or jointly execute a set (or multiple sets) of instructions 424 to perform any one or more of the methodologies discussed herein.

The example computer processing system 400 includes a processor 402 (e.g., a central processing unit (CPU), a graphics processing unit (GPU) or both), main memory 404 and static memory 406, which communicate with each other via bus 408. The computer processing system 400 may further include a graphics display unit 410 (e.g., a plasma display, a liquid crystal display (LCD) or a cathode ray tube (CRT)). The computer processing system 400 also includes an alphanumeric input device 412 (e.g., a keyboard), a cursor control device 414 (e.g., a mouse, touch screen, or the like), a storage unit 416, a signal generation device 418 (e.g., a speaker), and a network interface device 420.

The storage unit 416 includes machine-readable medium 422 on which is stored one or more sets of instructions 424 and data structures (e.g., software) embodying or utilized by any one or more of the methodologies or functions described herein. The instructions 424 may also reside, completely or at least partially, within the main memory 404 and/or within the processor 402 during execution thereof by the computer processing system 400, the main memory 404 and the processor 402 also constituting machine-readable, tangible media.

The instructions 424 may be further transmitted or received over a network 426 via a network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions 424. The term "machine-readable medium" shall also be taken to include any medium that is capable of storing, encoding or carrying a set of instructions 424 for execution by the computer processing system 400 and that cause the computer processing system 400 to perform any one or more of the methodologies of the present application, or that is capable of storing, encoding or carrying data structures utilized by or associated with such a set of instructions 424. The term "machine-readable medium" shall accordingly be taken to include, but not limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions and improvements fall within the scope of the claims.

What is claimed is:

1. A method of monitoring events occurring in a computer system, the method comprising:
parsing an event monitoring instruction including a condition, the parsing resulting in an event channel to monitor and the condition;
pausing execution of an application;
monitoring the event channel until an event occurs on the event channel;
evaluating the condition to determine whether the condition is satisfied; and
resuming execution of the application in response to the condition being satisfied.

2. The method of claim 1, wherein the method is performed without the use of a remote function call.

3. The method of claim 1, wherein the event monitoring instruction further includes a timeout value, and wherein the monitoring the event channel includes monitoring the event channel until an event occurs on the event channel and the condition is satisfied, or time has passed equal to or greater than the timeout value, whichever occurs first.

4. The method of claim 3, wherein the syntax of the event monitoring instruction is WAIT FOR <event channels>UNTIL <logical expression>UP TO <timeout>.

5. The method of claim 1, wherein the event monitoring instruction includes an instruction to check for registered event handlers.

6. The method of claim 1, wherein the event monitoring instruction is an Advanced Business Application Programming (ABAP) statement.

7. The method of claim 6, wherein the event channel includes an ABAP push channel.

8. The method of claim 6, wherein the event channel includes an ABAP messaging channel.

9. The method of claim 1, wherein the method is performed by an instance of an application server.

10. The method of claim 1, wherein syntax of the event monitoring instruction is WAIT FOR <event channels>UNTIL <logical expression>.

11. The method of claim 1, wherein the event monitoring instruction is created by the application.

12. A system comprising:
a database containing source code-expressing syntax for an event monitoring instruction; and
an application server, comprising one or more processors, configured to:
parse an event monitoring instruction including a condition, the parsing resulting in an event channel to monitor and the condition;
pause execution of an application;
monitor the event channel until an event occurs on the event channel;
evaluate the condition to determine whether the condition is satisfied; and
resume execution of the application in response to the condition being satisfied.

13. The system of claim 12, wherein the application server is an ABAP application server.

14. The system of claim 12, wherein the application server is an ABAP/Java application server.

15. The system of claim 12, wherein the parsing, pausing, monitoring, and resuming are performed without the use of a remote function call.

16. The system of claim 12, wherein the event monitoring instruction further includes a timeout value, and wherein the monitoring the event channel includes monitoring the event channel until an event occurs on the event channel and the condition is satisfied, or time has passed equal to or greater than the timeout value, whichever occurs first.

17. The system of claim 16, wherein the syntax is WAIT FOR <event channels>UNTIL <logical expression>UP TO <timeout>.

18. The system of claim 12, wherein the syntax is WAIT FOR <event channels>UNTIL <logical expression>.

19. A non-transitory computer-readable storage medium comprising instructions that, when executed by at least one processor of a machine, cause the machine to perform operations of monitoring events occurring in a computer system, including:
parsing an event monitoring instruction including a condition, the parsing resulting in an event channel to monitor and the condition;
pausing execution of an application;
monitoring the event channel until an event occurs on the event channel;
evaluating the condition to determine whether the condition is satisfied; and
resuming execution of the application in response to the condition being satisfied.

20. The non-transitory computer-readable storage medium of claim 19, wherein the instructions are performed without the use of a remote function call.

* * * * *